C. PALOMO Y GOITIANDIA.
LUBRICATOR FOR PISTON RODS.
APPLICATION FILED JULY 18, 1912.
1,073,282.
Patented Sept. 16, 1913.
2 SHEETS—SHEET 2.
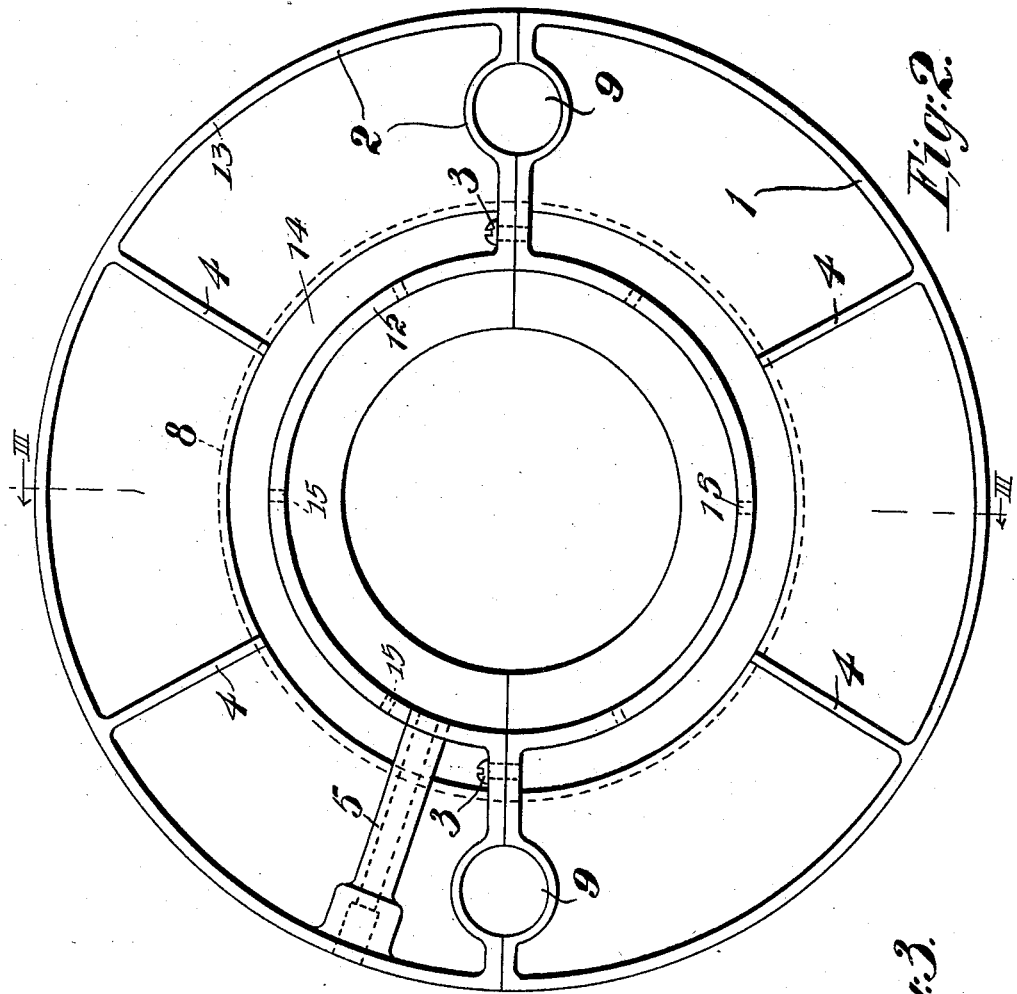
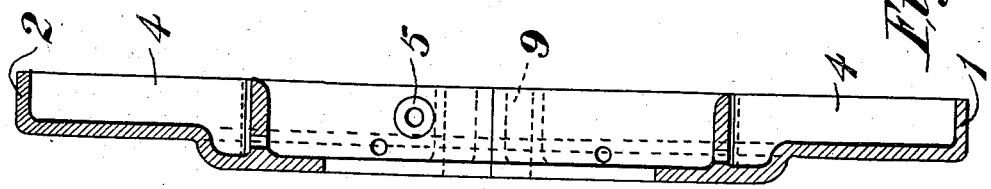

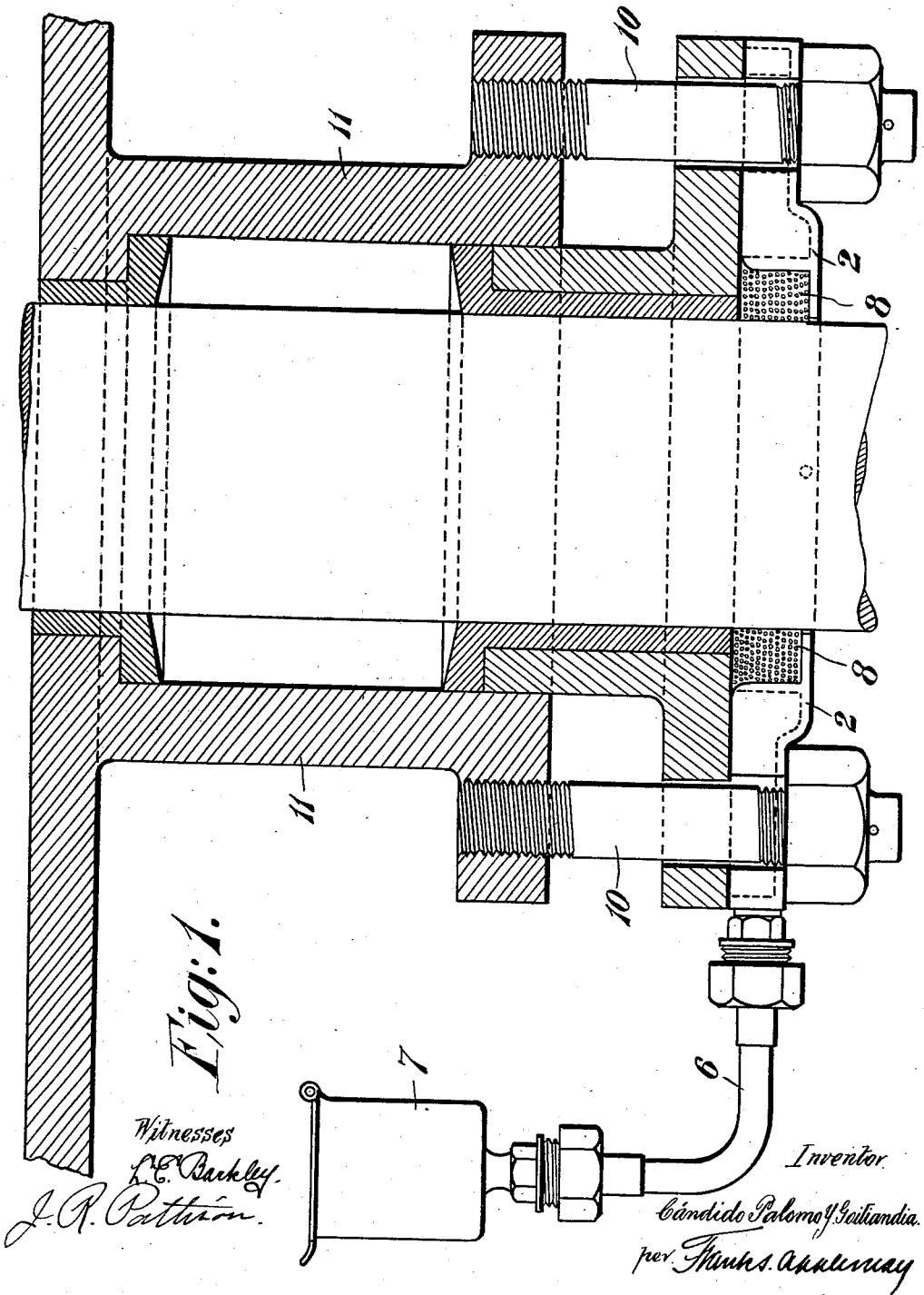

UNITED STATES PATENT OFFICE.

CÁNDIDO PALOMO Y GOITIANDIA, OF DEUSTO, BILBAO, SPAIN.

LUBRICATOR FOR PISTON-RODS.

1,073,282.  Specification of Letters Patent.  Patented Sept. 16, 1913.

Application filed July 18, 1912. Serial No. 710,221.

*To all whom it may concern:*

Be it known that I, CÁNDIDO PALOMO Y GOITIANDIA, a subject of the King of Spain, residing at Deusto, Bilbao, Spain, have invented new and useful Improvements in Lubricators for Piston-Rods, of which the following is a specification.

This invention consists of a lubricator for piston rods intended to be mounted on the stuffing boxes of existing engines.

The invention comprises an annular plate which carries a continuously oiled lubricating pad held in contact with the piston rod.

More particularly defined, the invention consists in forming an annular plate in two halves suitably secured together and in providing them with stiffening and strengthening ribs.

In carrying the invention into practice it is preferred to secure the two halves together by screws or the like, and to form the plate hollow on the side facing the stuffing box. The plate is mounted against the cover of the box and is drawn against it by tightening of the bolts of the stuffing box which are made to pass through said plate. Also a duct is formed in the plate itself to connect the pad to an oil pot or other lubricator.

An embodiment of the invention is illustrated in the accompanying drawings in which—

Figure 1 is a sectional elevation through the stuffing box showing the lubricating device in position. Fig. 2 is a plan view of the lubricator detached and Fig. 3 is a section thereof on line III—III of Fig. 2, looking in the direction of the arrows.

The lubricator consists of a hollow plate, preferably made in two halves 1, 2, connected together by screws or the like 3. Ribs 4 connecting the upstanding concentric inner and outer walls 12 and 13 are cast at intervals around the annular plate to strengthen the same. A duct 5 is arranged for the purpose of connecting a lubricating pipe 6 communicating with the supply of oil, such as reservoir 7. An annular pad 8 of suitable packing material is carried by the annular plate 1, 2 and is continuously kept supplied with lubricant from the reservoir 7. Outside the inner wall 12, the plates 1 and 2 are grooved to form a circular channel 14 to accommodate surplus lubricant. This channel is continuous, the ribs 4 being suitably formed to this end, and is in connection with the pad 8, by the perforations 15.

The hollow plate 1, 2 is preferably made open on the side adjacent to the stuffing box and in use is secured by the bolts of the stuffing box. Holes 9 are provided on the plate 1, 2 for the purpose of allowing the bolts 10 of the stuffing box 11 to pass through. It will be seen that when the lubricator is placed over the ends of these bolts and the nuts are drawn up, the lubricator is firmly held in position and is nevertheless readily removable when desired.

What I claim is:

1. A lubricator for engine piston rods comprising in combination an annular plate split along a diameter, open upon the side facing the engine stuffing box, and formed to pass over the bolts of the latter, means for securing the two halves together, strengthening ribs upstanding from said plate, means for pressing said plate against the cover of the engine stuffing box, and a lubricating pad adapted to be continuously supplied with lubricant and held in contact with the engine piston rod by means of said annular plate.

2. A lubricator for engine piston rods comprising in combination an annular plate split along a diameter, open upon the side facing the engine stuffing box, and formed to pass over the bolts of the latter, means for securing the two halves together, strengthening ribs upstanding from said plate, means for pressing said plate against the cover of the engine stuffing box, and a lubricating pad adapted to be continuously supplied with lubricant and held in contact with the engine piston rod by means of said annular plate, and a duct formed in said annular plate itself to supply lubricant to said pad.

3. A lubricator for engine piston rods comprising in combination an annular plate split along a diameter, open upon the side facing the engine stuffing box, and formed to pass over the bolts of the latter, means for securing the two halves together, strengthening ribs upstanding from said plate, means for pressing said plate against the cover of the engine stuffing box, and a lubricating pad adapted to be continuously supplied with lubricant and held in contact with the engine piston rod by means of said annular plate, a lubricant container carried by said annular plate, and a duct formed in the annular plate itself to connect said container to said pad.

4. A lubricator for engine piston rods comprising in combination a thin plate surrounding the piston rod, and formed with two circular concentric walls upstanding from its surface, the inner wall being spaced from the piston rod and said plate being formed in a circular channel outside said inner wall and in communication with the space inside said wall, and a pad between said inner wall of the piston rod.

5. A lubricator for engine piston rods comprising in combination an annular plate surrounding the piston rod formed in two halves meeting along a diameter, each half having concentric semi-circular walls upstanding from their surfaces, forming when placed together two circular concentric walls, the inner wall being spaced from the piston rod, and each half being formed with a semi-circular channel outside the inner walls and in communication with the space inside said inner wall, and a pad between said inner wall and the piston rod.

6. A stuffing box comprising in combination a cylindrical member surrounding the piston rod, a gland fitting into said member, a thin annular plate attached to said gland open on the side facing said gland, a pad carried by said plate in contact with the piston rod, a duct formed in said plate itself for supplying oil to said pad, and a channel in communication with said pad to accommodate surplus lubricant.

7. A stuffing box comprising in combination a cylindrical member surrounding the piston rod, a gland fitting into said member, an annular plate formed with concentric inner and outer upstanding walls facing said gland, said inner wall being spaced from the piston rod, said plate being also formed with a channel on the outside of said inner wall in communication with the space inside said wall, and a pad carried by said annular plate between said inner wall and the piston rod.

8. In a lubricator for engine piston rods the combination of a thin plate surrounding the piston rod, two circular, concentric walls upstanding from said plate, said inner wall being spaced from the piston rod and perforated, the plate being formed with a circular channel on the outside of said inner wall, a pad between said inner wall and the piston rod, a radial rib connecting said concentric walls and upstanding from said plate, a pipe passing between said concentric walls for supplying lubricant to said pad, and an oil container screwed into said pipe.

9. In a lubricator for engine piston rods, the combination of a thin plate surrounding the piston rod, two circular concentric walls upstanding from said plate, said inner wall being spaced from the piston rod, a pad between said inner wall and the piston rod, a pair of radial ribs connecting said concentric walls and expanded to form a pair of bolt holes at right angles to said thin plate, and a channel in communication with said pad, adapted to accommodate surplus lubricant.

10. In a lubricator for engine piston rods, the combination of a thin plate formed in two halves to surround the piston rod a pair of concentric semi-circular walls upstanding from each of said halves, upstanding walls connecting the outer ends of each of said pairs of concentric semi-circular walls, said two halves being adapted to be placed together to form a pair of concentric circular walls, the inner being spaced from the piston rod and perforated, and the two halves being formed with a semi-circular groove outside said inner wall, and a pad between said circular wall and the piston rod, said walls being formed with semi-circular portions to form circular bolt holes.

11. A lubricator for engine piston rods comprising in combination a thin plate formed in two halves to surround the piston rod, a pair of concentric semi-circular walls upstanding from each of said halves, upstanding walls connecting the outer ends of each of said pairs of concentric semi-circular walls, said two halves being adapted to be placed together to form a pair of concentric circular walls, the inner being spaced from the piston rod and perforated, and a thin plate being formed with a circular channel outside the inner wall, a pad between said inner circular wall and the piston rod, and bolts passing through the walls.

12. In a lubricator for engine piston rods, in combination a thin plate formed in two halves to surround the piston rod, a pair of concentric semi-circular walls upstanding from each of said halves, upstanding walls connecting the outer ends to each of said pairs of concentric semi-circular walls, said two halves being adapted to be placed together to form a pair of concentric circular walls, the inner being spaced from the piston rod and perforated, and the thin plate being formed with a channel in communication with the perforations to accommodate surplus lubricant, and a pad between said inner circular wall and the piston rod.

13. A lubricator for engine piston rods comprising in combination a thin plate surrounding the piston rod and formed in a circular channel, two circular concentric walls upstanding from said plate, the inner wall being spaced from the piston rod, a pad between said inner wall and the piston rod, a radial rib connecting said concentric walls and upstanding from said plate, a pipe passing between said concentric walls for supplying lubricant to said pad, and means for connecting said pad with the channel in said plate.

14. A lubricator for engine piston rods, comprising in combination a thin plate surrounding the piston rod and formed with a circular channel, two circular concentric walls upstanding from said plate, said inner wall being spaced from the piston rod, a pad between said inner wall and the piston rod and connected with the channel in said plate, and a radial rib connecting said concentric wall and upstanding from said plate.

15. A lubricator for engine piston rods, comprising in combination a thin plate surrounding the piston rod, two circular concentric walls upstanding from said plate, said inner wall being spaced from the piston rod, a pad between said inner wall and the piston rod and a radial rib connecting said concentric walls and upstanding from said plate.

16. A lubricator for engine piston rods, comprising in combination a thin plate surrounding the piston rod, two circular concentric walls upstanding from said plate, said inner wall being spaced from the piston rod, a pad between said inner wall and the piston rod, a radial rib connecting said concentric walls and upstanding from said plate, and a radial pipe supplying oil to said pad and carried by said plate.

17. A lubricator for engine piston rods, comprising in combination a thin plate surrounding the piston rod, two circular concentric walls upstanding from said plate, said inner wall being spaced from the piston rod, a pad between said inner wall and the piston rod and a radial rib connecting said concentric walls and upstanding from said plate and a pipe passing between said concentric walls for supplying lubricant to said pad.

18. In a lubricator for engine piston rods, the combination of a thin plate formed in two halves to surround the piston rod, a pair of concentric semi-circular walls upstanding from each of said halves, upstanding walls connecting the outer ends of each of said pairs of concentric semi circular walls, said two halves being adapted to be placed together to form a pair of concentric circular walls, the inner being spaced from the piston rod and a pad between said inner circular wall and the piston rod.

19. In a lubricator for engine piston rods, the combination of a thin plate formed in two halves to surround the piston rod, a pair of concentric semi-circular walls upstanding from each of said halves, upstanding walls connecting the outer ends of each of said pairs of concentric semi circular walls, said two halves being adapted to be placed together to form a pair of concentric circular walls, the inner being spaced from the piston rod, a pad between said inner circular wall and the piston rod and bolts passing through the walls.

20. In a lubricator for engine piston rods, the combination of a thin plate formed in two halves to surround the piston rod, a pair of concentric semi-circular walls upstanding from each of said halves, upstanding walls connecting the outer ends of each of said pairs of concentric semi circular walls, said two halves being adapted to be placed together to form a pair of concentric circular walls, the inner being spaced from the piston rod and a pad between said inner circular wall and the piston rod said walls being formed with semi circular portions to form circular bolt holes.

21. A lubricator for engine piston rods, comprising in combination a thin plate surrounding the piston rod, two circular concentric walls upstanding from said plate, said inner wall being spaced from the piston rod, a pad between said inner wall and the piston rod and a pair of radial ribs connecting said concentric walls and expanded to form a pair of bolt holes at right angles to said thin plate.

22. A lubricator for engine piston rods, comprising in combination a thin plate surrounding the piston rod, two circular concentric walls upstanding from said plate, said inner wall being spaced from the piston rod, a pad between said inner wall and the piston rod, a radial rib connecting said concentric walls and upstanding from said plate, a pipe passing between said concentric walls for supplying lubricant to said pad and an oil container screwed into said pipe.

23. In a lubricator for engine piston rods, the combination of a thin circular plate surrounding the piston rod, and formed with a circular channel concentric therewith, two circular concentric walls upstanding from said plate, said inner wall being spaced from the piston rod and just within the inner edge of the channel in the plate and perforated, a pad between said inner wall and the piston rod, and a radial rib connecting said concentric walls and upstanding from said plate.

24. A lubricator for engine piston rods, comprising in combination a thin plate surrounding the piston rod, two circular concentric walls upstanding from said plate, said inner wall being spaced from the piston rod, a pad between said inner wall and the piston rod, a radial rib connecting said concentric walls and upstanding from said plate, a pipe passing between said concentric walls for supplying lubricant to said pad, an oil container screwed into said pipe, and a radial pipe supplying oil to said pad and carried by said plate.

In testimony whereof I have signed my name to this specification in the presence of two subscribing witnesses.

CÁNDIDO PALOMO Y GOITIANDIA.

Witnesses:
DIOGENE ZIRNY,
LEONARD E. HAYNES.

Copies of this patent may be obtained for five cents each, by addressing the "Commissioner of Patents, Washington, D. C."